US010843080B2

(12) United States Patent
Hsiao

(10) Patent No.: US 10,843,080 B2
(45) Date of Patent: Nov. 24, 2020

(54) AUTOMATED PROGRAM SYNTHESIS FROM NATURAL LANGUAGE FOR DOMAIN SPECIFIC COMPUTING APPLICATIONS

(71) Applicant: Michael S. Hsiao, Blacksburg, VA (US)

(72) Inventor: Michael S. Hsiao, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 240 days.

(21) Appl. No.: 15/440,490

(22) Filed: Feb. 23, 2017

(65) Prior Publication Data

US 2017/0239576 A1     Aug. 24, 2017

Related U.S. Application Data

(60) Provisional application No. 62/299,047, filed on Feb. 24, 2016.

(51) Int. Cl.
*G06F 17/27*     (2006.01)
*A63F 13/63*    (2014.01)
(Continued)

(52) U.S. Cl.
CPC ............ *A63F 13/63* (2014.09); *A63F 13/215* (2014.09); *A63F 13/42* (2014.09); *G06F 8/41* (2013.01);
(Continued)

(58) Field of Classification Search
CPC ............ G06F 17/2785; G06F 17/2705; G06F 17/30637; G06F 19/00; G06F 17/30256;
(Continued)

(56) References Cited

U.S. PATENT DOCUMENTS 5,038,296 A * 8/1991 Sano ................. G06F 8/10
381/101
6,173,441 B1 * 1/2001 Klein ............... G06F 8/41
704/9
(Continued)

FOREIGN PATENT DOCUMENTS

EP     0182460 A1 *  5/1986  ............ G09B 5/065

OTHER PUBLICATIONS

"Mobile robot programming using natural language" Lauria S., Bugmann G., Kyriacou T., Klein E. (2002) Robotics and Autonomous Systems, 38 (3-4), pp. 171-181.*

(Continued)

*Primary Examiner* — Michael Ortiz-Sanchez
(74) *Attorney, Agent, or Firm* — Thomas | Horstemeyer LLP

(57) ABSTRACT

Disclosed are various embodiments for automated program synthesis from a natural language for domain specific computing applications. In one embodiment, a natural language processor may be configured to parse words from a sentence of text formed in a natural language, such as English, following a grammatical structure for the natural language. The words may be compared to a dictionary to identify a token. The text formed in the natural language may be converted to an intermediate format of programming code in a programming language, such as C, where the intermediate format includes the token. The token may invoke a function or a routine of a library written in the programming language. The intermediate format may be compiled into executable program code to generate an application, such as a video game, for execution.

20 Claims, 11 Drawing Sheets

(51) Int. Cl.

| | | |
|---|---|---|
| *A63F 13/42* | (2014.01) | |
| *A63F 13/215* | (2014.01) | |
| *G06F 8/41* | (2018.01) | |
| *G06F 40/30* | (2020.01) | |
| *G06F 40/55* | (2020.01) | |
| *G06F 40/242* | (2020.01) | |
| *G06F 40/247* | (2020.01) | |
| *G06F 40/284* | (2020.01) | |
| *G06F 40/289* | (2020.01) | |

(52) U.S. Cl.
CPC .......... *G06F 40/242* (2020.01); *G06F 40/247* (2020.01); *G06F 40/284* (2020.01); *G06F 40/289* (2020.01); *G06F 40/30* (2020.01); *G06F 40/55* (2020.01)

(58) Field of Classification Search
CPC ......... G06F 17/30684; G06F 17/30976; G06F 17/2735; G06F 17/277; G06F 17/2775; G06F 17/2795; G06F 17/2881; G06F 17/3025; G06F 17/30259; G06F 17/30277; G06F 17/30401; G06F 17/3043; G06F 17/30557; G06F 17/30569; G06F 17/30604; G06F 17/30864; G06F 3/0481; G06F 3/04845; G06F 8/41; G06F 16/322; G06F 16/90344; G06F 40/232; G06F 16/215; G06F 16/2365; G06F 16/2379; G06F 40/14; G06F 40/149; G06F 40/151; G06F 40/174; G06F 40/186; G06F 40/205; G06F 40/242; G06F 40/53; G06Q 30/0276; G06T 13/00; G06T 2213/04; G10L 15/18; G10L 2015/088; G10L 21/06; G10L 15/00; G10L 15/063; G10L 15/14; H04N 9/8715; H04N 1/32128; G09B 21/009; G06K 9/00469

See application file for complete search history.

(56) References Cited

U.S. PATENT DOCUMENTS

| | | | | |
|---|---|---|---|---|
| 6,246,986 B1* | 6/2001 | Ammicht | ................ | G10L 15/22 704/231 |
| 6,499,013 B1* | 12/2002 | Weber | .................. | G10L 15/265 704/257 |
| 7,302,383 B2* | 11/2007 | Valles | .................... | G06F 17/271 704/231 |
| 7,346,490 B2* | 3/2008 | Fass | ...................... | G06F 17/241 704/7 |
| 7,853,623 B2* | 12/2010 | Koike | ............... | G06F 17/30265 707/752 |
| 7,966,182 B2* | 6/2011 | Orcutt | .................... | G06F 3/167 704/231 |
| 8,402,032 B1* | 3/2013 | Brunsman | ............. | G06F 16/951 707/748 |
| 9,069,814 B2* | 6/2015 | Wolfram | ........... | G06F 17/30401 |
| 9,594,737 B2* | 3/2017 | Wolfram | ................ | G06F 17/24 |
| 9,594,750 B1* | 3/2017 | Reddy | .................... | G06F 40/186 |
| 9,619,209 B1* | 4/2017 | Allen | ........................ | G06F 8/30 |
| 9,851,950 B2* | 12/2017 | Wolfram | ................ | G06F 17/28 |
| 2002/0120647 A1* | 8/2002 | Annan | .................. | G06F 40/126 715/234 |
| 2003/0212541 A1* | 11/2003 | Kinder | .................... | G06F 17/27 704/4 |
| 2005/0005266 A1* | 1/2005 | Datig | .................... | G06F 17/279 717/136 |
| 2006/0293894 A1* | 12/2006 | Peyroux | ................ | G06F 17/274 704/257 |
| 2007/0072678 A1* | 3/2007 | Dagres | .................... | G07F 17/32 463/42 |
| 2009/0244071 A1* | 10/2009 | Kuo | .................... | G06F 17/2872 345/473 |
| 2014/0379334 A1* | 12/2014 | Fry | .......................... | G10L 15/22 704/235 |
| 2015/0220618 A1* | 8/2015 | Horesh | ................. | G06F 16/285 707/738 |
| 2016/0379629 A1* | 12/2016 | Hofer | .................... | G06F 17/277 704/257 |
| 2016/0379633 A1* | 12/2016 | Lehman | ................. | G10L 15/22 704/275 |
| 2017/0004374 A1* | 1/2017 | Osindero | .................. | G06T 1/20 |
| 2017/0263248 A1* | 9/2017 | Gruber | .................... | G10L 15/22 |
| 2018/0144064 A1* | 5/2018 | Krasadakis | ....... | G06F 17/30976 |

OTHER PUBLICATIONS

"Fact Sheet: President Obama Announces Computer Science for All Initiative," The White House (Jan. 30, 2016), https://www.whitehouse.gov/the-press-office/2016/01/30/fact-sheet-president-obama-announces-computer-science-all-initiative-0 (last visited Feb. 23, 2017).
"Hour of Code," https://hourofcode.com (last visited Feb. 23, 2017).
"Girls Who Code," http://girlswhocode.com (last visited Feb. 23, 2017).
"Scratch—Imagine, Program, Share," Scratch, https://scratch.mit.edu (last visited Feb. 23, 2017).
"STEM Attrition: College Students' Paths Into and Out of STEM Fields Statistical Analysis Report," U.S. Dept. of Education, http://nces.ed.gov/pubs2014/2014001rev.pdf (last visited Feb. 23, 2017).
"National Center for Women & Information Technology," http://www.ncwit.org (last visited Feb. 23, 2017).
"Anybody can learn | Code.org," Code.org, http://code.org (last visited Feb. 23, 2017).
"Google CS First," Google, http://cs-first.com (last visited Feb. 23, 2017).
"Learn to code | Codeacademy," Codeacademy, http://www.codeacademy.com (last visited Feb. 23, 2017).
"Computer Programming | Computing," Khan Academy, https://www.khanacademy.org/computing/computer-programming (last visited Feb. 23, 2017).
"2015 Sales, Demographic and Usage Data—Essential Facts About the Computer and Video Game Industry." Entertainment Software Association. pp. 3. 2015.
Liu, H, & Lieberman, H. Metaphor: Visualizing Stories as Code. Intelligent User Interfaces Conference (IUI 2005), San Diego CA 2005.
A. W. Biermann and B. W. Ballard, "Toward natural language computation," Comput. Linguist., vol. 6, No. 2, pp. 71-86, 1980.
G. Little and R. C. Miller. Keyword programming in Java. Autom. Softw. Eng., 16(1):37-71, 2009.
T. Kwiatkowski, L. Zettlemoyer, S. Goldwater, and M. Steedman. Lexical generalization in CCG grammar induction for semantic parsing. In EMNLP, 2011.
R. J. Mooney. Learning for semantic parsing. In CICLing, 2007.
W. R. Harris and S. Gulwani. Spreadsheet table transformations from examples. In PLDI, 2011.
R. Singh and S. Gulwani. Synthesizing number transformations from input-output examples. In CAV, 2012.
R. Singh and S. Gulwani. Learning semantic string transformations from examples. PVLDB, 5, 2012.
T. Gvero and V. Kuncak, "Synthesizing Java expressions from free-form queries," 2015 ACM OOPSLA, Oct. 2015., pp. 416-432.
N. N. Shirvi and M. H. Panchal, "Translation of English Algorithm in C Program using Syntax Directed Translation Schema," IJCSMC, vol. 3, No. 2, Feb. 2014, pp. 752-760.
N. Nihalani, S. Silakari, and M. Motwani. Natural language interface for database: A brief review. IJCSI, 8(2), 2011.
NLyze: Interactive programming by natural language for spreadsheet data analysis and manipulation. In SIGMOD, 2014.
"Gamestar Mechanic Learn to design video games," Gamestar Mechanic, https://gamestarmechanic.com (last visited Feb. 23, 2017).

(56) References Cited

OTHER PUBLICATIONS

A Cozzieand and S. T. King. "Macho: Writing programs with natural language and examples." Technical report, University of Illinois at Urbana-Champaign, 2012.

N. Kushman and R. Barzilay, "Using Semantic Unification to Generate Regular Expressions from Natural Language," NAACL 2013.

"Make 2D Games with Gamemaker," Yoyo Games, http://yoyogames.com (last visited Feb. 23, 2017).

"Unity—Game Engine," Unity, http://unity3d.com (last visited Feb. 23, 2017).

* cited by examiner

```
scatter(C) {
    for all instances Ci of object class C
        set the position of Ci to be random values
}
```

FIG. 8

```
chase(A, B) {
    v = the vector between B's position and A's position;
    normalize v;
    move A in the direction and magnitude represented by v;
}
```

FIG. 9

```
control(A) {
    switch (key) {
        case k_up:
            moveUp(A); break;
        case k_down:
            moveDown(A); break;
        case k_right:
            moveRight(A); break;
        case k_left:
            moveLeft(A); break;
    }
}
```

FIG. 10

AUTOMATED PROGRAM SYNTHESIS FROM NATURAL LANGUAGE FOR DOMAIN SPECIFIC COMPUTING APPLICATIONS

CROSS-REFERENCE TO RELATED APPLICATION

This application claims the benefit of and priority to U.S. Provisional Patent Application No. 62/299,047 filed on Feb. 24, 2016 entitled "AUTOMATED PROGRAM SYNTHESIS FROM NATURAL LANGUAGE FOR COMPUTER GAMES," the content of which being incorporated by reference in its entirety herein.

BACKGROUND

Natural Language Programming (NLPr) refers to a type of programming performed in a human's naturally spoken or written language (e.g., English, Spanish, or other natural language) that can be analyzed and converted to machine executable code. For instance, a sentence or a paragraph written in a natural language (as opposed to a formal programming language) may be parsed and understood as a computational program. If NLPr is successful, the impact can be far-reaching. Not only can it significantly increase productivity in software development, it can provide enormous innovations in software design, execution, and understanding. In terms of computing education, NLPr can help eliminate the inherent fear and frustration of learning a conventional computer programming language. Nevertheless, the ambiguity and nuances of natural language can make NLPr extremely challenging.

DESCRIPTION OF TECHNOLOGY AREA

This disclosure relates to programming code compilation, namely converting natural language text in a spoken or written language into machine executable code for particular domains of applications, such as video games.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 8, 9, and 10 are examples of pseudocode describing operation of functions or routines in a library according to various embodiments of the present disclosure.

DETAILED DESCRIPTION

The present disclosure relates to automated program synthesis from a natural language for domain specific computing applications. As noted above, natural languages, such as English, have an ambiguous nature and contain many nuances for machine interpretation. Accordingly, various embodiments are disclosed for programmatically compiling natural language text to executable code for particular domains of applications, such as video games. In one embodiment, a user may write a program as a story told in English or other natural language, which is ultimately translated to executable code using token identification; synonym, verb, and pronoun resolution; fuzzy grammar matching; and code generation. Predicates, action verbs, adjectives, and other semantics relevant to a domain may be first obtained to form a dictionary for the application domain space. However, in various embodiments, new terms may be learned automatically. The semantics of each sentence may also be bound to a particular application domain.

One embodiment may include employing a computing device to identify words from at least one sentence of text formed in a natural language following a grammatical structure for the natural language. The words may be compared to a dictionary to identify a token stored in association with the at least one of the words. The text formed in the natural language may be converted to an intermediate format of programming code in a predetermined programming language, where the intermediate format includes the token. In some embodiments, the token is a word or predefined variable that invokes a function or a routine of a library written in the programming language. The intermediate format may be compiled into executable program code to generate an application, such as a video game, for execution.

In various embodiments, for a word in a sentence not having a corresponding entry in the dictionary, a meaning of the word may be determined based on a contextual analysis of the sentence, and the word may be stored in the dictionary or a temporary dictionary separate from the dictionary in association with the derived meaning. The contextual analysis may include, for example, analyzing at least one antecedent clause of the sentence and analyzing at least one consequent clause of a subsequent sentence or preceding sentence. Fuzzy matching methodologies may also be employed. In further embodiments, the computing device may generate a certainty metric for the sentence that indicates a degree to which the sentence was understood programmatically. If the certainty metric satisfies (e.g., falls below) an error threshold, an error message may be generated.

In the following discussion, a general description of a system for automated program synthesis from natural language text and its components is provided, followed by a discussion of the operation of the same.

Figure 1:
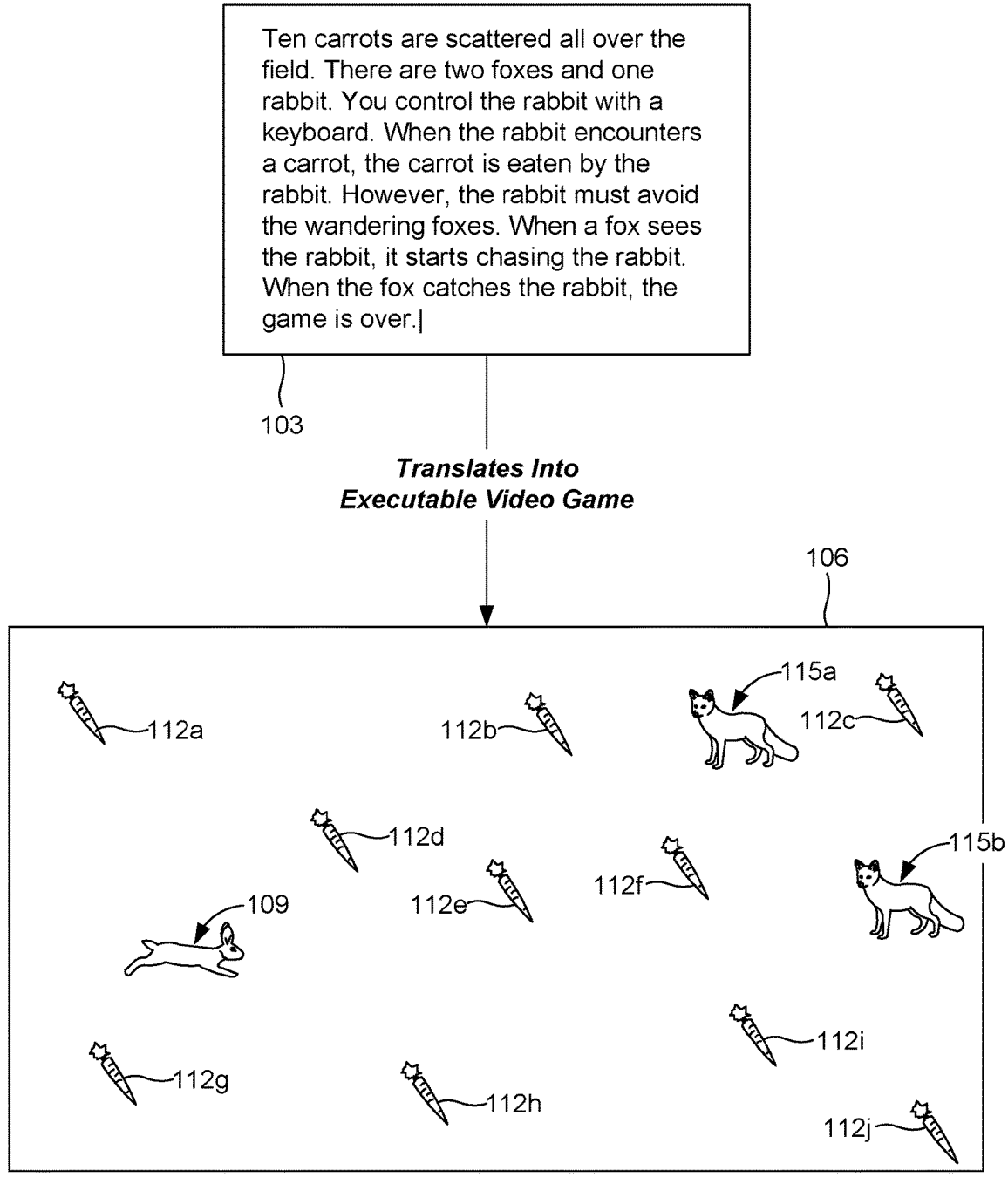
FIG. 1 is a schematic diagram illustrating natural language text compiled into an executable video game according to various embodiments of the present disclosure.

Referring first to FIG. 1, a schematic diagram 100 is shown that includes natural language text 103 or, in other words, text formed in a natural language, such as English. For instance, a user may write or verbally dictate a story using voice-to-text software in English or other language to create a computer application using grammatical rules for a particular language. As may be appreciated, a user may be more comfortable and familiar with grammatical requirements for forming a proper sentence in their native (or non-native) language, as opposed to memorizing rules or required constructs for a potentially complicated programming language, such as C or C++.

As a non-limiting example, if a developer wishes to write a video game involving a rabbit, fox, and carrots, the developer may write an amount of natural language text 103 that includes:

> Ten carrots are scattered all over the field. There are two foxes and one rabbit. You control the rabbit with keyboard. When the rabbit encounters a carrot, the carrot is eaten by the rabbit. However, the rabbit must avoid the wandering foxes. When a fox sees the rabbit, it starts chasing the rabbit. When the fox catches the rabbit, the game is over.

The natural language text 103 shown in FIG. 1 includes both unconditional and conditional sentences. For example, "The fox wanders around" is an example of an unconditional sentence. On the other hand, a conditional sentence includes "When a fox catches a rabbit, the rabbit dies." The sentence is conditional as it depends on the outcome of the predicate (e.g., whether the fox catches the rabbit). The grammar for all possible sentences involving the actions and predicates may be derived as a set of grammatical rules. Alternatively, semantics of the natural language text 103 may be obtained using a classification system. In either case, an intermediate format for each sentence may be generated. The intermediate format may include code generated in a predetermined programming language. For example, the sentence that states, "The fox wanders around," may be converted to "wander(fox)," where "wander" is a function in a library and "fox" is a parameter of the function. Similarly, the sentence that states, "When a fox catches a rabbit, the rabbit dies," may be converted to "if catch(fox, rabbit), die(rabbit)," where "catch" and "die" are functions in a library and "fox" and "rabbit" are parameters of the respective functions.

Ultimately, the natural language text 103 is converted to one or more intermediate programming languages, which may be ultimately compiled into machine-executable code. In one example, the natural language text 103 shown in the non-limiting example of FIG. 1 is used to generate a video game 106, where a player may use an input device, such as a keyboard, mouse, joystick, or other suitable input device, to control a rabbit 109. Using the input device, a user may navigate the rabbit 109 across a field to collect carrots 112a . . . 112j (collectively "carrots 112") while trying to avoid foxes 115a . . . 115b (collectively "foxes 115"). As specified in the natural language text 103, if the fox catches the rabbit, the game will end. The video game 106 or other type of application may be rendered in a display, such as a computer monitor, television, tablet display, smartphone display, or other appropriate display, as will be described.

Figure 2:
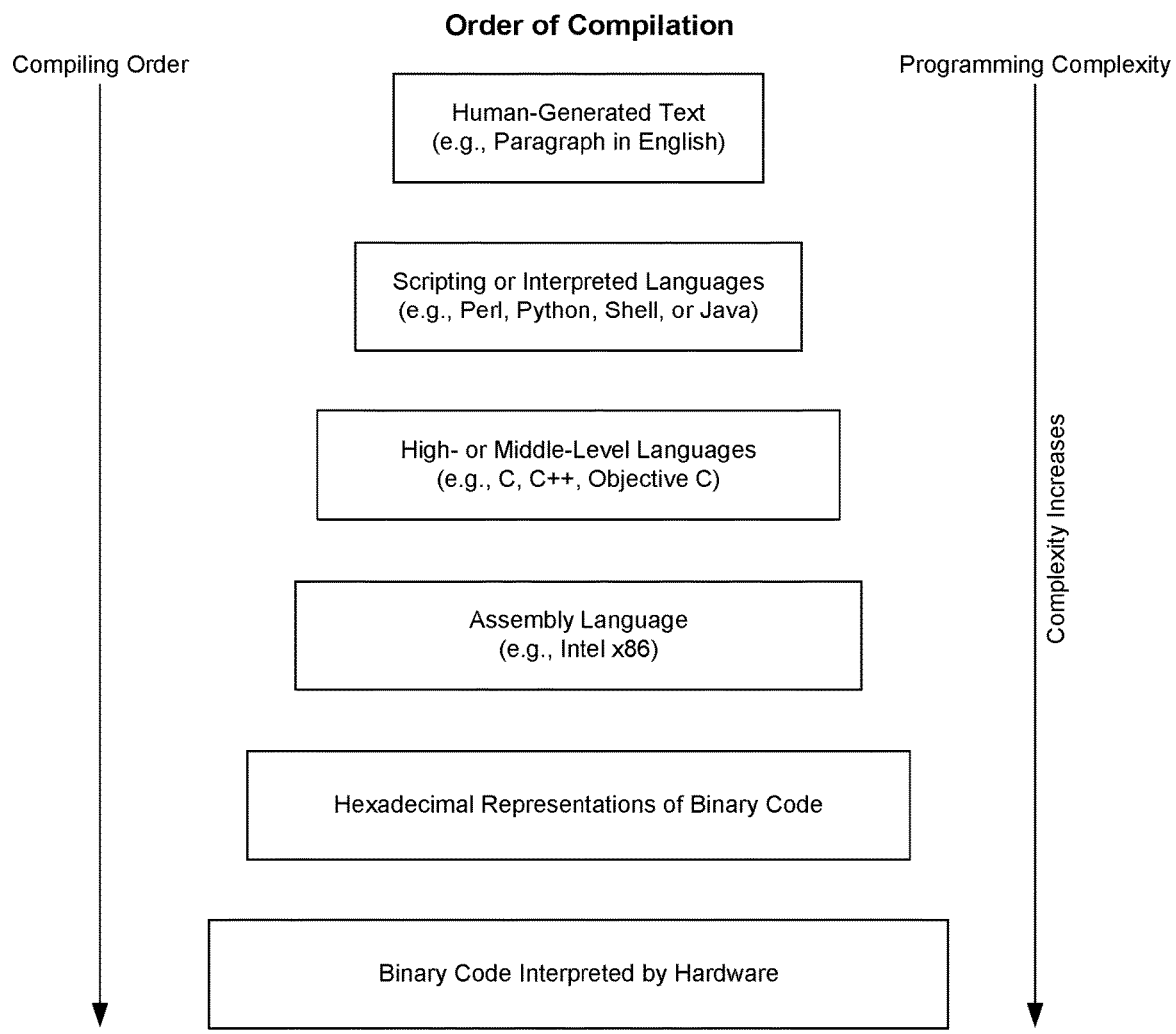
FIG. 2 is a schematic diagram illustrating an order of compilation according to various embodiments of the present disclosure.

Turning now to FIG. 2, a schematic diagram 200 is shown illustrating an order of compilation for a computer application according to various embodiments of the present disclosure. Starting at the top, natural language text 103, or text written in a natural language (e.g., English, Spanish, French, Italian, Japanese, Mandarin or German), is generated by a developer or other user. As discussed above, the natural language text 103 may follow grammatical rules for the given language. A compiler may parse the natural language text 103 and convert the natural language text 103 into one or more intermediate formats. In one embodiment, the natural language text 103 is converted from its natural language to a scripting language, such as Perl, Python, Shell, or Java, or other similar scripting language. The scripting language may then be converted into a high- or middle-level programming language, such as C, C++, Objective C, or other language. In another embodiment, the natural language text 103 is converted directly into a high- or middle-level programming language, such as C, C++, Objective C, or other language.

The compilation may proceed, for example, by continuously compiling the program from the intermediate format to an assembly language, such as Intel® x86, which is then compiled into hexadecimal representations of binary code. Ultimately, the natural language text 103 is compiled or otherwise converted to binary code or other code capable of interpretation by hardware, such as a processor. As shown in FIG. 2, programming complexity is shown where natural language text 103 is the easiest for a human to understand while binary code is the most difficult.

Figure 3:
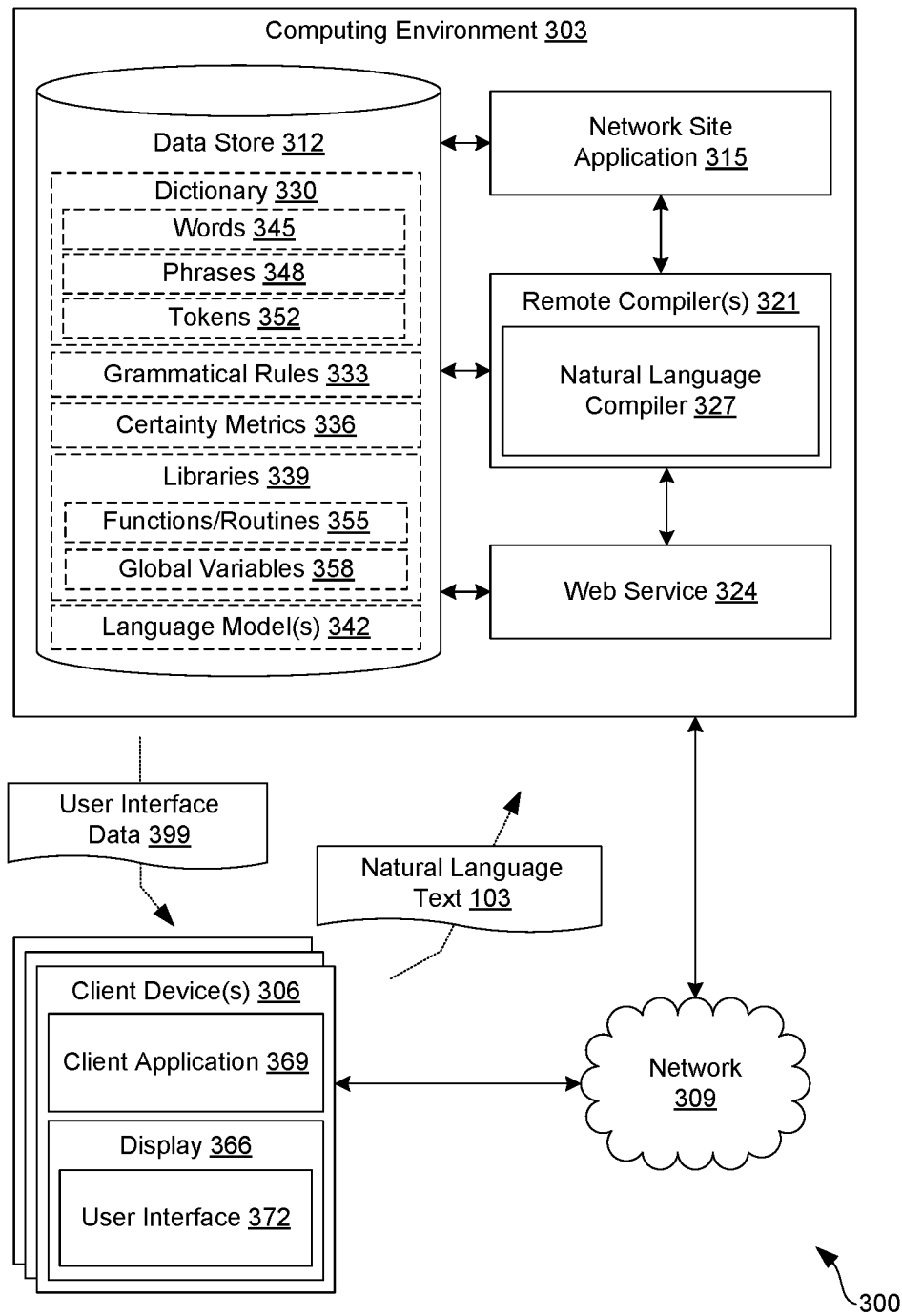
FIG. 3 is a drawing of a networked environment according to various embodiments of the present disclosure.

With reference to FIG. 3, shown is a networked environment 300 according to various embodiments. The networked environment 300 includes a computing environment 303 and a client device 306, which are in data communication with each other via a network 309. The network 309 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, or any other distributed computing arrangement. In some cases, the computing environment 303 may correspond to an elastic computing resource where the allotted capacity of processing, network, storage, or other computing-related resources may vary over time.

Various applications or other functionality may be executed in the computing environment 303 according to various embodiments. In addition, various data is stored in a data store 312 that is accessible to the computing environment 303. The data store 312 may be representative of a plurality of data stores 312 as can be appreciated. The data stored in the data store 312, for example, is associated with the operation of the various applications and/or functional entities described below.

The components executed on the computing environment 303, for example, include a network site application 315, one or more remote compilers 321, a web service 324, and potentially other applications, services, processes, systems, engines, or functionality not discussed in detail herein. One of the remote compilers 321 may include, for example, a natural language compiler 327, as will be described.

The network site application 315 is executed to generate network pages, such as web pages or other types of network content that may be provided to client devices 306 for the purposes of receiving the natural language text 103, as will be discussed. For instance, the network site application 315 may generate user interface data that comprises a text box or other user interface component that allows a developer to write a program in a natural language.

The remote compilers 321 may include one or more compilers used to convert natural language text 103 into executable code, or code capable of being interpreted by hardware of a computing device (e.g., a processor). In various embodiments, one of the remote compilers 321 includes a natural language compiler 327 while other ones of the remote compilers 321 may include, for example, C compilers, C++ compilers, assembly compilers, and so forth.

The natural language compiler 327 is executed to analyze a sentence to programmatically determine a meaning or "intent" of the sentence. According to various embodiments, the natural language compiler 327 may be configured to identify and resolve nouns, verbs, pronouns, or other parts of speech. Additionally, the natural language compiler 327 may be configured to compare words 345 or phrases 348 used in a sentence to a dictionary 330 in the data store 312 to determine whether identical or fuzzy matched entries are identified. When a word 345 or phrase 348 of a sentence is identified, the natural language compiler 327 may generate code in an intermediate format, such as C, C++, or other programming language. The intermediate format may be generated using token matching, as will be described.

The web service 324 is executed to provide a medium for communication between the computing environment 303 and the client devices 306 over the network 309. The web service 324 may comprise a web-based application programming interface (API) embodied in software that facilitates programmatic service calls (or API calls) made by a client application to communicate with the components of the computing environment 303, such as the network site application 315, the remote compilers 321, the natural language compiler 327, or other services or applications not described herein. According to various embodiments, the web-based API may further comprise a representational state transfer (REST) API, a simple object access protocol (SOAP) API, or another suitable API. Programmatic service calls may be performed using a hypertext transfer protocol (HTTP), a secure hypertext transfer protocol (HTTPS), or other similar protocol. Non web-based user interfaces are also possible, such as one generated by a local client application.

The data stored in the data store 312 includes, for example, a dictionary 330, grammatical rules 333, certainty metrics 336, libraries 339, language models 342, and potentially other data. The dictionary 330 may include a listing of words 345 and phrases 348 for a particular domain of applications, such as video games. In the domain of video games, some examples of words 345 may include "run," "catch," "jump," "hide," "scared," as well as variations of those words 345, such as "ran," "running," "caught," etc. Each of the words 345 or phrases 348 may be associated with a token 352. A token 352 may include a keyword, a function name, a variable name, or other entity that may be used to replace a word 345 or a phrase 348 to generate programming code in an intermediate format.

In some instances, the token 352 may be identical to a corresponding word 345 or phrase 348. For instance, the sentence "A catches B" may be analyzed, where "catches" is an entry in the dictionary 330 and the token 352 associated with "catches" is "catches." The natural language compiler 327 may use the token 352 to generate an intermediate format of "catches(A,B)," where catch is a name of a function in a library 339. In other instances, the token 352 may be different than a word 345 or phrase 348. For instance, the sentence "A catches B" may be analyzed, where "catches" is an entry in the dictionary 330 and the token 352 associated with "catches" is "catch." The natural language compiler 327 may use the token 352 to generate an intermediate format of "catch(A,B)," where catch is a name of a function or a routine in a library 339.

The grammar for all possible sentences involving actions and predicates can be derived as a set of grammatical rules 333. An intermediate format for each sentence may be generated using the grammatical rules 333. For example, "The fox wanders around" may be converted by the natural language compiler 327 to "wander(fox)." Similarly, "When a fox catches a rabbit, the rabbit dies" may be converted to "if catch(fox, rabbit), die(rabbit)."

The certainty metrics 336 may include metrics determined for each sentence of natural language text 103. In one embodiment, a certainty metric 336 includes a number that reflects a percentage that the natural language compiler 327 is certain about an understanding of the sentence in English or other natural language. In some embodiments, the certainty metric may be computed as a function of token matching and grammatical matching. For instance, different weights can be given to token matching and grammatical matching. If tokens are matched and grammar (or semantics) are capable of being understood, a high certainty metric may be generated. Conversely, if tokens are unable to be matched and grammar (or semantics) are not capable of being understood, a low certainty metric may be generated.

The libraries 339 may include predefined (or prewritten) functions/routines 355 and global variables 358 for a given domain or type of applications, as may be appreciated. For instance, in the domain of video games 106, the functions/routines 355 may include "catch( )" "run( )" "jump( )" "control( )" or other function/routine 355 that may be needed to compile an executable video game 106. Global variables 358 may include predetermined variables that may be used in generating code in an intermediate format that can be compiled, as may be appreciated.

The client device 306 is representative of a plurality of client devices that may be coupled to the network 309. The client device 306 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 306 may include a display 366. The display 366 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 306 may be configured to execute various applications such as a client application 369 and/or other applications. The client application 369 may be executed in a client device 306, for example, to access network content served up by the computing environment 303 or other servers, thereby rendering a user interface 372 on the display 366. To this end, the client application 369 may comprise, for example, a browser, a dedicated application, etc., and the user interface 372 may comprise a network page, an application screen, etc. The client device 306 may be configured to execute applications beyond the client application 369 such as, for example, email applications, social networking applications, word processors, spreadsheets, or other applications.

Next, a general description of the operation of the various components of the networked environment 300 is provided. To begin, a user may desire to write a computer application, but may not be familiar with a high-, medium-, or low-level programming language. As such, the user may execute a client application 369 on his or her client device 306 to access a network site offered through the network site application 315. For instance, a user may execute a web browser and navigate to a particular website where the network site application 315 generates user interface data 399 that causes a user interface 372 to be rendered by the web browser. The user interface 372 may include a text box or similar field to receive text 103 in a natural language. For instance, the user may write natural language text 103 and submit the natural language text 103 to the computing environment 303 after completion, such that the computing environment 303 can compile the natural language text 103 into an executable application remotely.

To this end, the natural language compiler 327 may be employed to parse the natural language text 103 written by a user and identify words 345 or phrases 348 in each sentence of the natural language text 103. Based on the words 345 and phrases 348 identified in each sentence, grammatical rules 333 may be used to identify semantics of the sentence. The grammatical rules 333 may be defined such that different ways of saying the same sentence are captured. For example, a sentence may state, "When a rabbit is caught by a fox, the rabbit dies." The natural language compiler 327 may identify entities (or nouns), such as "rabbit" and "fox." Moreover, the natural language compiler 327 may identify "caught" and "dies" as actions performed on the rabbit. In various embodiments, the parsing performed by the natural language compiler 327 may be performed by an application service independent from the natural language compiler 327.

To identify semantics, words 345 or phrases 348 from the natural language text 103 are compared to entries in the dictionary 330. In the above example, the words 345 "rabbit," "fox," and "carrots" may be entries in the dictionary 330. Each entry in the dictionary 330 may have a corresponding token 352, where the token 352 is used in the place of the word 345 or phrase 348 when generating an intermediate format. The token 352 may include a name of a prewritten function/routine 355 or routine stored in the library 339. For example, if the word 345 of "caught" is used in the natural language text 103, the dictionary 330 may indicate that a token 352 to be used in the intermediate format is "catch." The token 352 of "catch" may correspond to the function/routine 355 "catch( )" in the library 339. Similarly, another token 352, such as "die" may be associated with "dies," "is executed," "kill," or other related words 345. Thus, an intermediate format of "if catch(fox, rabbit), die(rabbit)" may be generated by the natural language compiler 327.

If semantics of the sentence are not identifiable by the natural language compiler 327, the remote compiler 321 may return an error message. In some embodiments, the network site application 315 may cause the user interface 372 to suggest the user to write the sentence in a different way. Also, in some embodiments, the network site application 315 may provide additional error messaging as to how or why the sentence was not understood. In further embodiments, suggestions on how to make the natural language text 103 more understandable may be provided to the user.

As may be appreciated, the dictionary 330, the libraries 339, other data, and operation of the natural language processors 318 and remote compilers 321 may be tailored to a particular domain (or type) of computer application. In other words, the dictionary 330, the libraries 339, and operations performed by the natural language compiler 327 may be unique to video games 106 as opposed to other types of applications. To this end, the natural language text 103 may be parsed or analyzed differently based on a domain specified by a user. In some embodiments, the application domain may include, for example, a video game 106, a web browser, a word processing application, a social networking application, or other type of computer application, as may be appreciated.

Given a specific domain, the remote compiler 321 may construct a language model 342 for the domain. Succinctly, a language model 342, L, may be described as a tuple, where L=(E, A, T, P, S, G). E refers to a set of entities, A refers to a set of actions, T refers to a set of attributes. P refers to a set of optional predicates and S refers to a set of selectors. Finally, G refers to an underlying grammar binding words 345 and phrases 348 for the domain. The items in sets E, A, T, P, and S may include words 345 or phrases 348.

The extent to which these sets encompass a language model 342 may also determine the expressiveness of the resulting natural language for the domain of computing applications. To understand the sentences, grammatical rules 333 may be employed by the natural language compiler 327 to analyze a sentence in which a varying number of phrases 348 from each of the five aforementioned sets is comprised. The natural language compiler 327 or the remote compiler 321 may then determine if a sentence in the natural language text 103 is valid. In some embodiments, the sets in the language model 342 (L) are not fixed. Instead, they may grow and evolve with time as more natural language text 103 is received and analyzed. Ultimately, the remote compiler 321 may automatically translate the natural language text 103 written in a natural language into executable program code based on a language model 342 and what it accepts as a valid sentence.

As a non-limiting example in a domain of video games 106, consider a rover game that allows a user to control the rover to traverse a field. The set of entities, E, may include the rover, a wall, a desk, a chair, or other object, entity, or player with which the rover interacts. In a synthesized program, the natural language compiler 327 may recognize these entities as objects because they are nouns and may have entries in the dictionary 330. The set of actions, A, may include "go," "turn," "stop," etc. which describes operations that the rover may perform. These may be associated with prewritten functions/routines 355, methods, or routines (also known as member functions) for corresponding objects stored in the data store 312 as a library 339. The set of attributes, T, may include colors, shapes, etc. associated with various entities. These may be represented as member attributes. Next, the set of predicates, P, may include "see_a_wall( )" "sense_a_signal( )" etc. A predicate may return a value of true or false. In some embodiments, predicates may be implemented as general functions/routines 355 that return Boolean values. Finally, the optional set of selectors, S, may include positions, ordering information, etc. An example of a grammatically valid natural language instruction might include: "The rover goes straight. When the rover sees a blue wall, it stops."

Another example in a domain of video games 106 may include a set of entities, E, that are characters involved in the video game 106, such as ghosts, aliens, etc. The set of actions, A, may include chase, flee, wander, stop, jump, die, etc. The set of attributes, T, may include color, speed, etc. associated with each of the characters. In some embodiments, the user may be able to add more attributes on-the-fly or, in other words, dynamically. The set of predicates, P, in this example may include "see( )" "reach( )" "touch( )" "catch( )" etc. Finally, the set of selectors, S, may permit a user to write a phrase, such as "the second fox on the left." Additional examples of grammatically valid natural language text 103 may include: "The fox wanders around. When a fox sees a rabbit, it starts to chase the rabbit. When a fox catches a rabbit, the rabbit dies." As in the rover example above, the five sets are mapped to objects, methods, member attributes, and general functions/routines 355.

The aforementioned sets may be dynamic in the sense that new terms may be learned. For example, the natural language text 103 may state: "When a rabbit sees a fox, it becomes scared. When a rabbit is scared, it flees." The term "scared" may be learned and associated with behavior at compilation or at run-time. In this example, program code may be generated that causes the rabbit to run away from the fox when the rabbit is "scared."

As noted above, a set of natural language sentences in the natural language text 103 may consist of both unconditional and conditional sentences. For example, "The fox wanders around," is an example of an unconditional sentence, while "When a fox catches a rabbit, the rabbit dies," is an example of a conditional sentence as it depends on the outcome of the predicate (e.g., whether the fox catches the rabbit). The grammar for all possible sentences involving the actions and predicates may be derived as a set of grammatical rules 333. Alternatively, semantics may be obtained using a classification system. In either case, the natural language compiler 327 generates an intermediate format for each sentence in the natural language text 103, if needed. For example, the natural language text 103 of "The fox wanders around" may be converted to "wander(fox)," and the natural language text 103 of "When a fox catches a rabbit, the rabbit dies" may be converted to "if catch(fox, rabbit), die(rabbit)."

Figure 4:
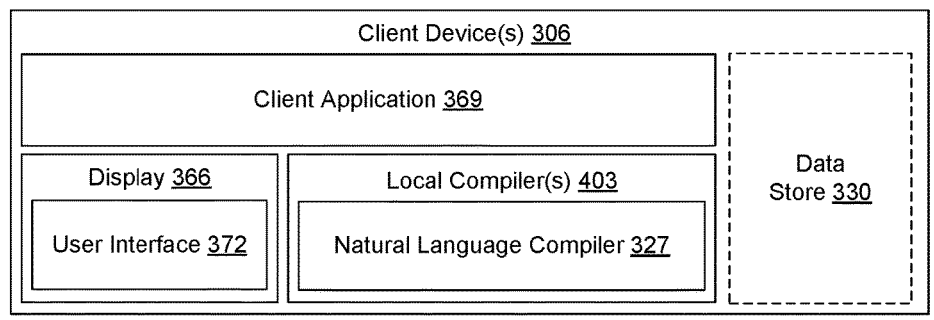
FIG. 4 is a drawing of a client device having a natural language compiler according to various embodiments of the present disclosure.

Referring next to FIG. 4, a client device 306 is shown having a natural language compiler 327 according to various embodiments of the present disclosure. In the embodiment of FIG. 3, a remote compiler 321 is shown where natural language text 103 is compiled remotely, or over a network 309. In the embodiment of FIG. 4, however, local compilers 403 may be employed. For instance, the natural language compiler 327 may be installed on the client device 306 and configured to perform all operations described herein locally on the client device 306, instead of in the computing environment 303.

Figure 5:
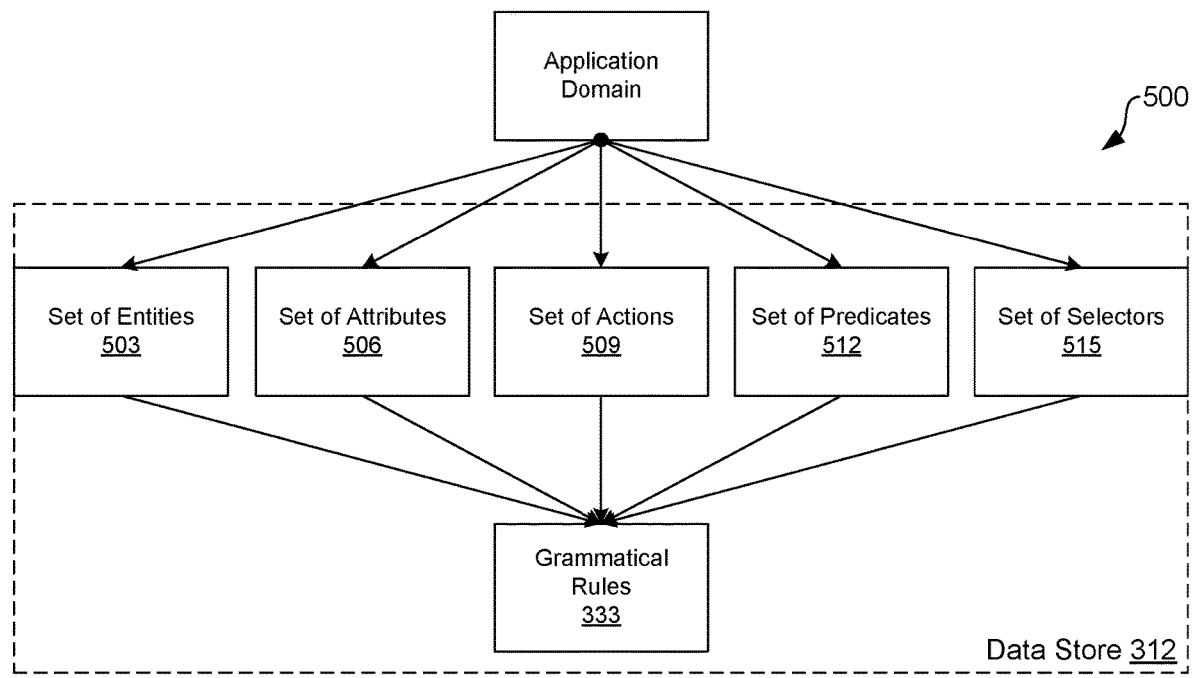
FIG. 5 is a schematic diagram illustrating a process of generating a language model for a domain specific application according to various embodiments of the present disclosure.

Turning now to FIG. 5, a schematic diagram 500 is shown depicting the construction of the language model 342 which may include the various sets described above, as well as grammatical rules 333 for a particular domain of applications. As described herein, the sets may not be static, but may increase (or decrease) over time. For a particular domain of applications, such as video games 106, a set of entities 503, a set of attributes 506, a set of actions 509, a set of predicates 512, and a set of selectors 515 may be defined.

After text 103 is converted into an intermediate format (e.g., C++), a compiler for that intermediate format (e.g., a C++ compiler) may be employed to compile the intermediate format to executable program code.

Figure 6:
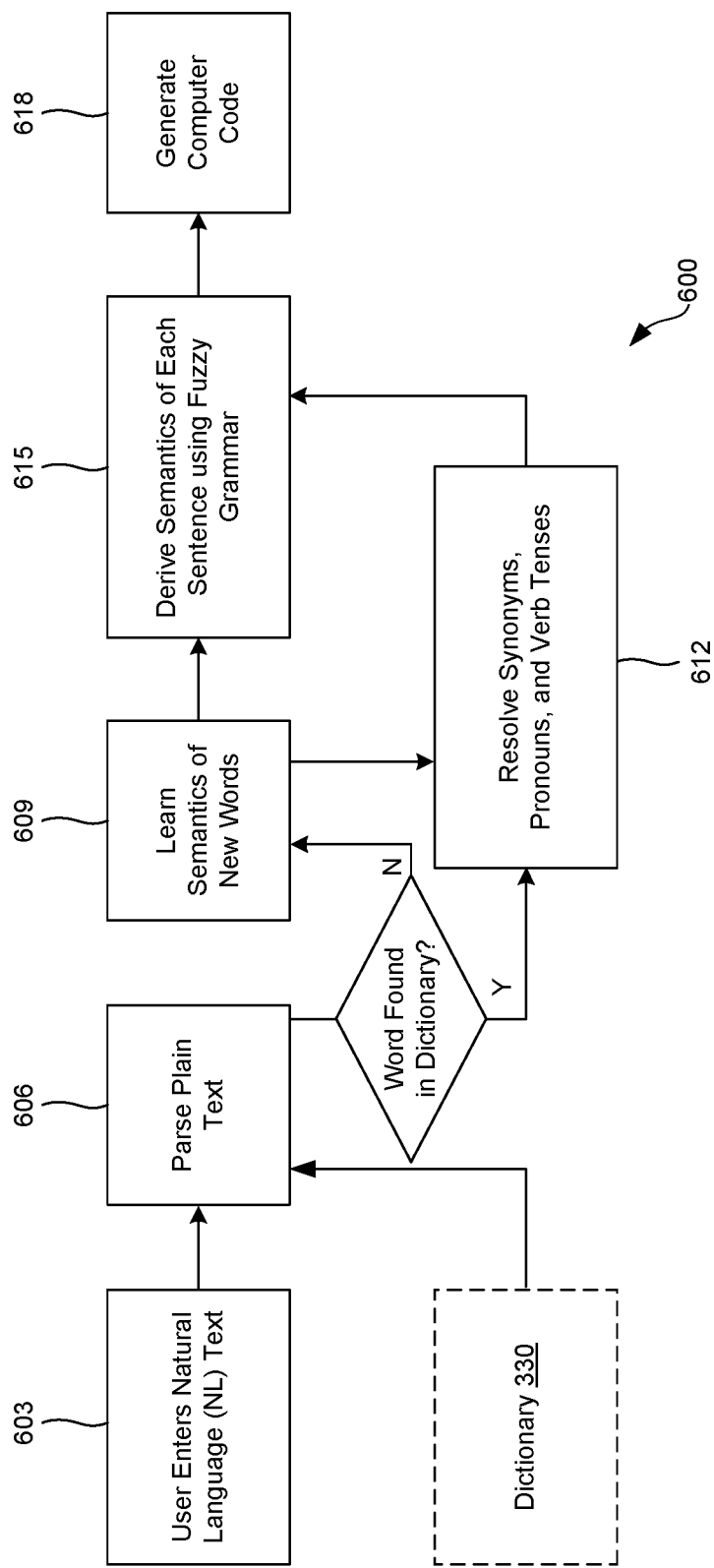
FIGS. 6 and 7 are flowcharts illustrating example functionality implemented as portions of an application executing in a computing environment or a client device according to various embodiments of the present disclosure.

Referring next to FIG. 6, shown is a flowchart 600 that provides one example of an operation of the natural language compiler 327 or other system or service according to various embodiments. It is understood that the flowchart 600 of FIG. 6 provides merely an example of the many different types of functional arrangements that may be employed to perform automated program synthesis from a natural language for domain specific computing applications as described herein. As an alternative, the flowchart of FIG. 6 may be viewed as depicting an example of elements of a method implemented in the computing environment 303 or the client device 306 according to one or more embodiments.

As discussed above, a user interface 372 for entering a story is provided to a user on a client device 306. In 603, a user may enter natural language text 103 in a text box or other suitable form of the user interface 372. After the story is entered and submitted, in 606, each sentence of the natural language text 103 may be parsed. The dictionary 330 of known words 345 for a particular application domain may be employed to identify characters, actions, places, etc. from the sentences. Semantics of a sentence may be determined by comparing words 345 or phrases 348 used in the sentence to entries in the dictionary 330 to decipher the meaning of the sentence.

As may be appreciated, in some scenarios, a user may use new words 345 (or words not found in the dictionary 330) to explain certain conditions. If so, in 609, semantics of new words 345 may be learned. In 612, the semantics identified from the sentences may be examined for synonyms, verb tenses, etc., if needed. For instance, if the natural language text 103 includes the word 345 "caught," a synonym for "catch" may be identified and a token 352 of "catch( )" may be used to generate the intermediate format. Additionally, pronouns identified in the natural language text 103 may be bound to a corresponding character or entity. In 615, a predefined fuzzy grammar may be employed to derive semantics for each sentence. As may be appreciated, fuzzy grammar may be employed as there are multiple ways to say the same thing. Finally, in 618, the intermediate format is compiled into executable code and, in some embodiments, may be executed remotely or locally for the user.

As may be appreciated, the conventional way to model a programming language's grammar is through finite grammatical rules 333. In natural language processing, however, such a method may result in an incredibly complicated and vast set of grammatical rules 333. Instead, fuzzy grammar matching may be employed to reduce complexity while slightly trading off complexity for accuracy. By gradually adding new words 345 to the dictionary 330 and refining fuzzy matching rules, the decrease in accuracy may be overcome. While fuzzy matching may be employed, in other embodiments, machine learning or deep learning may be employed.

Figure 7:
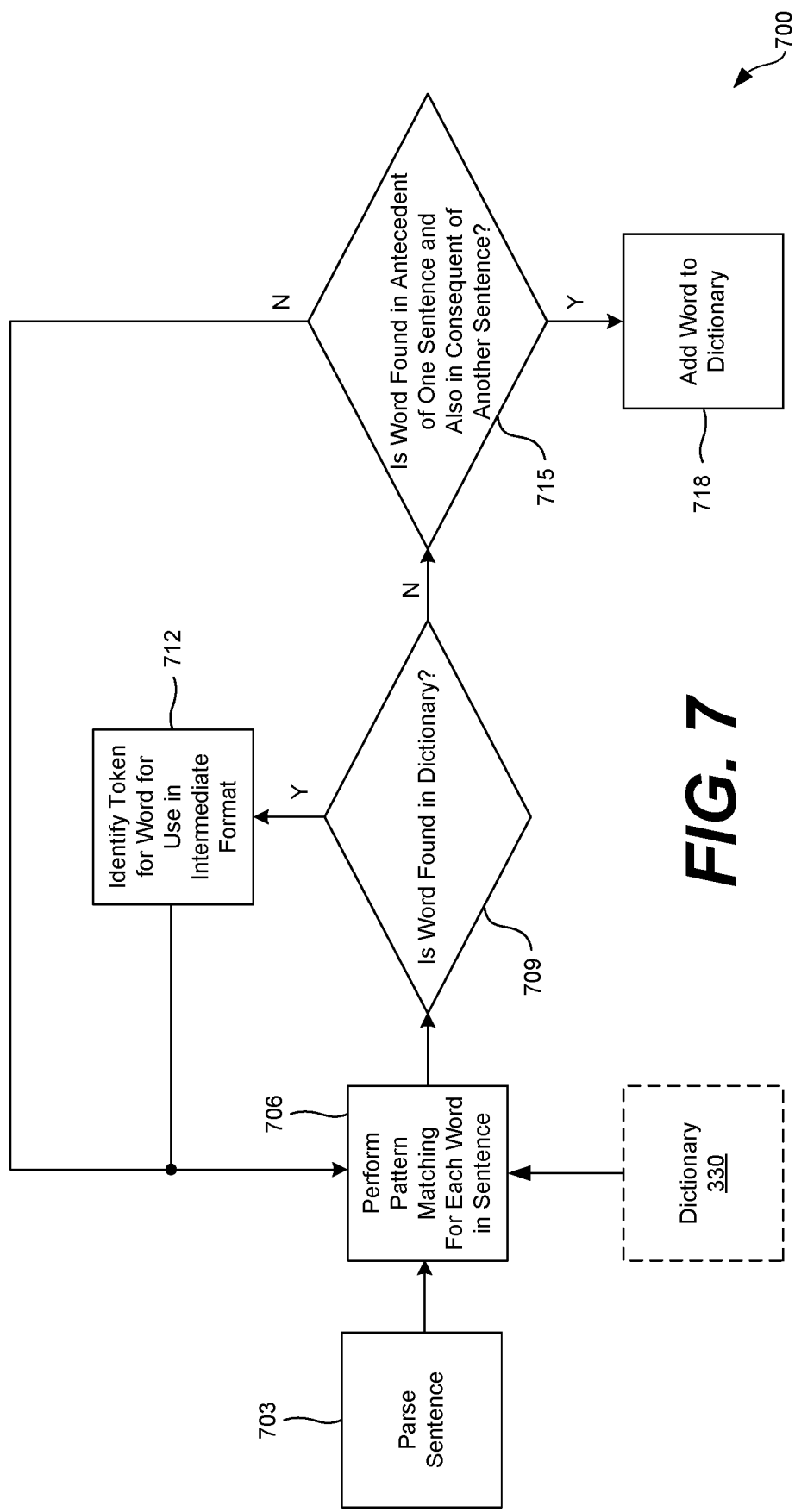

Moving on to FIG. 7, a flowchart 700 is shown that provides another example operation of the natural language compiler 327 or other system or service according to various embodiments. It is understood that the flowchart 700 of FIG. 7 provides merely an example of the many different types of functional arrangements that may be employed to perform automated program synthesis from a natural language for domain specific computing applications as described herein. As an alternative, the flowchart of FIG. 7 may be viewed as depicting an example of elements of a method implemented in the computing environment 303 or the client device 306 according to one or more embodiments.

After the natural language text 103 has been received and identified, one sentence is retrieved from the story at a time. In 703, each sentence may be parsed to extract all words 345 of the sentence. Next, in 706, pattern matching may be performed for each word 345 extracted from the sentence using the dictionary 330, which may include a listing of known words 345 and phrases 348 predetermined for the domain. In various embodiments, the dictionary 330 may include character names, as well as action verbs, adjectives, articles, etc. In 709, it may be determined whether the word 345 exists in the dictionary 330. If the word 345 matches an entry in the dictionary 330, the process may proceed to 712 where a token 352 is identified for the word 345 for use in generating the intermediate format.

Referring back to 709, if no match is found in the dictionary 330, the word 345 may be treated as a potentially new term that may describe new behaviors and a contextual anaylsis may thus be performed. In one embodiment, the process may proceed to 712 to determine whether the word 345 is found in an antecedent of one sentence and also in the consequent of another sentence. For example, consider the following story:

"When a rabbit eats a diamond, it becomes empowered. . . . When a fox sees an empowered rabbit, the fox runs away."

In this example, the term "empowered" was not initially included in the dictionary 330. After parsing, however, the word 345 "empowered" may be added to the dictionary 330 or a temporary dictionary, in 718. The semantics of the word 345 "empowered" may be learned or inferred from the context. Referring again to 715, it may be determined whether the word 345 is found in at least one antecedent clause and one consequent clause. In the example above, the word 345 "empowered" satisfies this determination. The rabbit becomes empowered in a consequent clause of a sentence and an empowered rabbit is referred to in an antecedent clause of the other sentence. The meaning of "empowered" is then found in the consequent clause of the sentence whose antecedent contains this same new term. In this case, "empowered" may be associated with "flee" or "run away," and the association may be stored in the dictionary 330 or other suitable location in the data store 312.

As may be appreciated, the preexisting terms of "flee" or "run away" in the dictionary 330 may be associated with the "flee" token 352 (or other token 352) that, when compiled and executed, invokes a function/routine 355 of "flee( )" As the new term, "empowered," has been held to be synonymous with "flee" or "run away," the term "empowered" may also be associated with the "flee" token 352 such that, when the term "empowered" is used, the "flee( )" function is invoked.

Let $A_i$ and $C_i$ denote the antecedent and consequent clauses of a sentence (i), respectively. If a word 345 is found in $A_i$ and $C_j$ for sentences i and j, the word 345 may be added to the temporary dictionary. Furthermore, $A_j$ describes the condition for which the word 345 may be set, and $C_i$ describes the action that will result when the word 345 is true. Note that $C_i$ may contain a conjunction of conditions, one of which is the word 345.

For each word 345 that is found in either the dictionary 330 (or temporary dictionary), a token 352 may be identified to represent it when generating an intermediate format. The token 352 may also give a notion of the part of speech to the word 345. For example, the target word 345 may be a subject noun, object noun, action verb, pronoun, etc. For a sentence that states, "When the rabbit meets a fox, it is killed," a replacement of the tokens 352 with words 345 in the sentence may result in a sentence that states: "When rabbit meet fox, it die." This sentence formed of tokens 352 may result in less computational complexity during a conversion of the natural language to the intermediate format.

With reference to FIGS. 8, 9, and 10, examples of pseudocode describing some example functions/routines 355 or routines in the library 339 are shown for an application in the domain of video games 106 according to various embodiments. The scatter routine may be called to randomly assign placement of an object in a field, for instance, when text 103 includes: "Thirty carrots are scattered all over the field." The chase routine may be called to follow an object in the field, for instance, when text 103 includes: "When a fox sees the rabbit, it starts chasing the rabbit." Similarly, the control routine may be called to bind input devices to control of a character of the video game 106. For example, the control routine may be called when the natural language text 103 includes: "You control the rabbit with keyboard" or similar sentence.

Figure 11A:
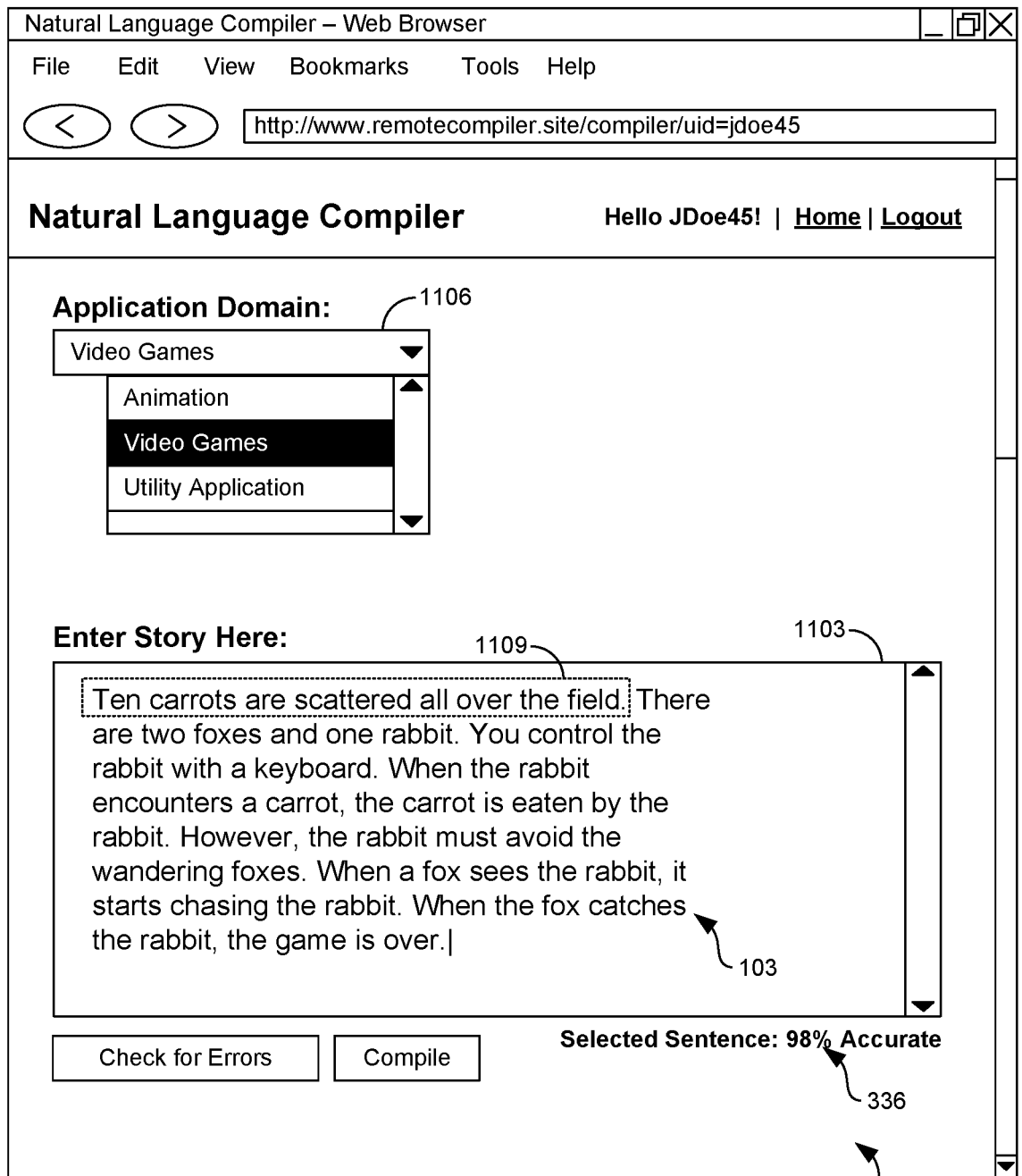
FIGS. 11A and 11B are pictorial diagrams of example user interfaces rendered by a client device in the networked environment of FIG. 1 according to various embodiments of the present disclosure.
Figure 11B:
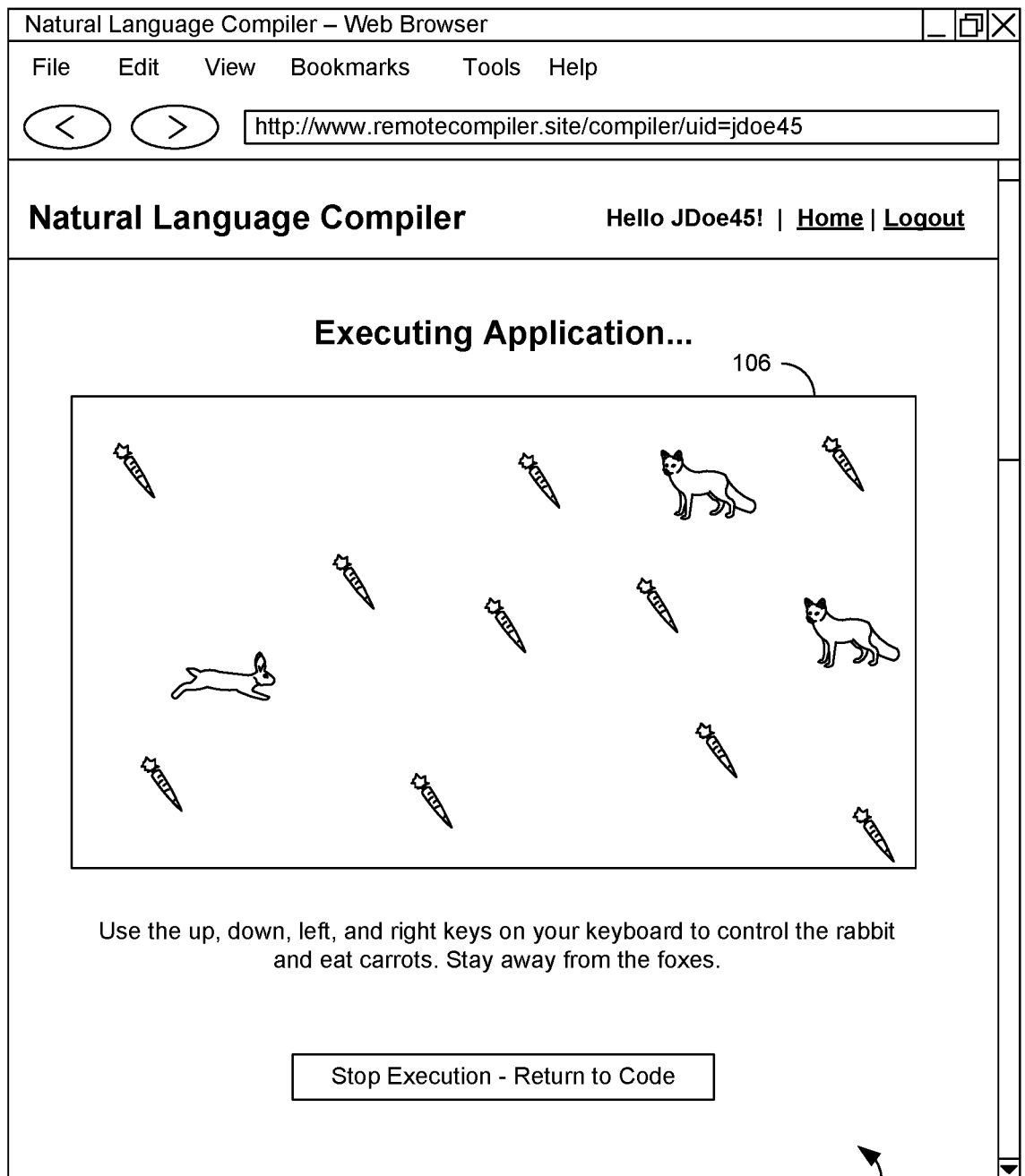

Referring next to FIGS. 11A and 11B, example user interfaces 372 are shown according to various embodiments of the present disclosure. In some embodiments, a web-based interface may be employed to allow users to participate and learn programming in a natural language without the need to install software, such as the natural language compiler 327. To do so, the user interface 372 may include a text box 1103 to capture text 103 written in a natural language. A dropdown box 1106 may include a specification of a domain for the application, thereby instructing the natural language compiler 327 which dictionary 330, library 339, or other data to use when compiling the natural language text 103. The user interface 372 may highlight or permit a user to select a sentence 1109 to receive a certainty metric 336 generated for the highlighted or selected sentence. In further embodiments, a certainty metric 336 may be generated for an entire paragraph as a function of a certainty metric 336 generated for each sentence in the paragraph. Some sentences may be weighted more heavily than other sentences, as may be appreciated.

After the story is entered and submitted for code generation, the sentences in the story may be parsed to identify characters or other entities, a setting, a control, and a plot or a conflict section. In the example shown in FIG. 11A involving a rabbit, carrots, and foxes, the setting is given by the first sentence that describes carrots being scattered over a field. The second sentence in the story describes the control section, in which arrow keys for a keyboard are used to control the rabbit character. Finally, the plot involves eating the carrots and the fox chasing the rabbit. In some embodiments, the natural language text 103 may be divided into two sections for ease of parsing: the setting and the plot. However, this may be optional according to various embodiments. To this end, the natural language text 103 must be written in a predetermined order or according to a predetermined structure, in some embodiments.

As shown in the user interface 372 of FIG. 11B, the natural language text 103 written in a natural language may be ultimately compiled into machine-executable code. In one embodiment, a compiled video game 106 may be shown in the user interface 372. In some embodiments, the video game 106 may be executed remotely on the computing environment 303 or locally on the client device 306. In other embodiments, a compiled application may be generated for distribution to various client devices 306. In some embodiments, the size, color, and other attributes for the video game 106 or its corresponding objects may be initialized to default values at the start of the program. In other embodiments, the size, color, and other attributes for the video game 106 or its corresponding objects may be determined by matching grammar or tokens 352, as may be appreciated. For instance, the sentence: "Ten carrots are scattered all over a blue field" may be used to indicate that the field should have a blue color. Similarly, the sentence: "Ten orange carrots are scattered all over a green field" may be used to indicate that the field should have a green color and that the carrots should be orange. The sentence: "The field should be 200 units wide and 100 units tall" may be used to indicate that the field should have a 2:1 aspect ratio (e.g., 200 pixels×100 pixels).

Figure 12:
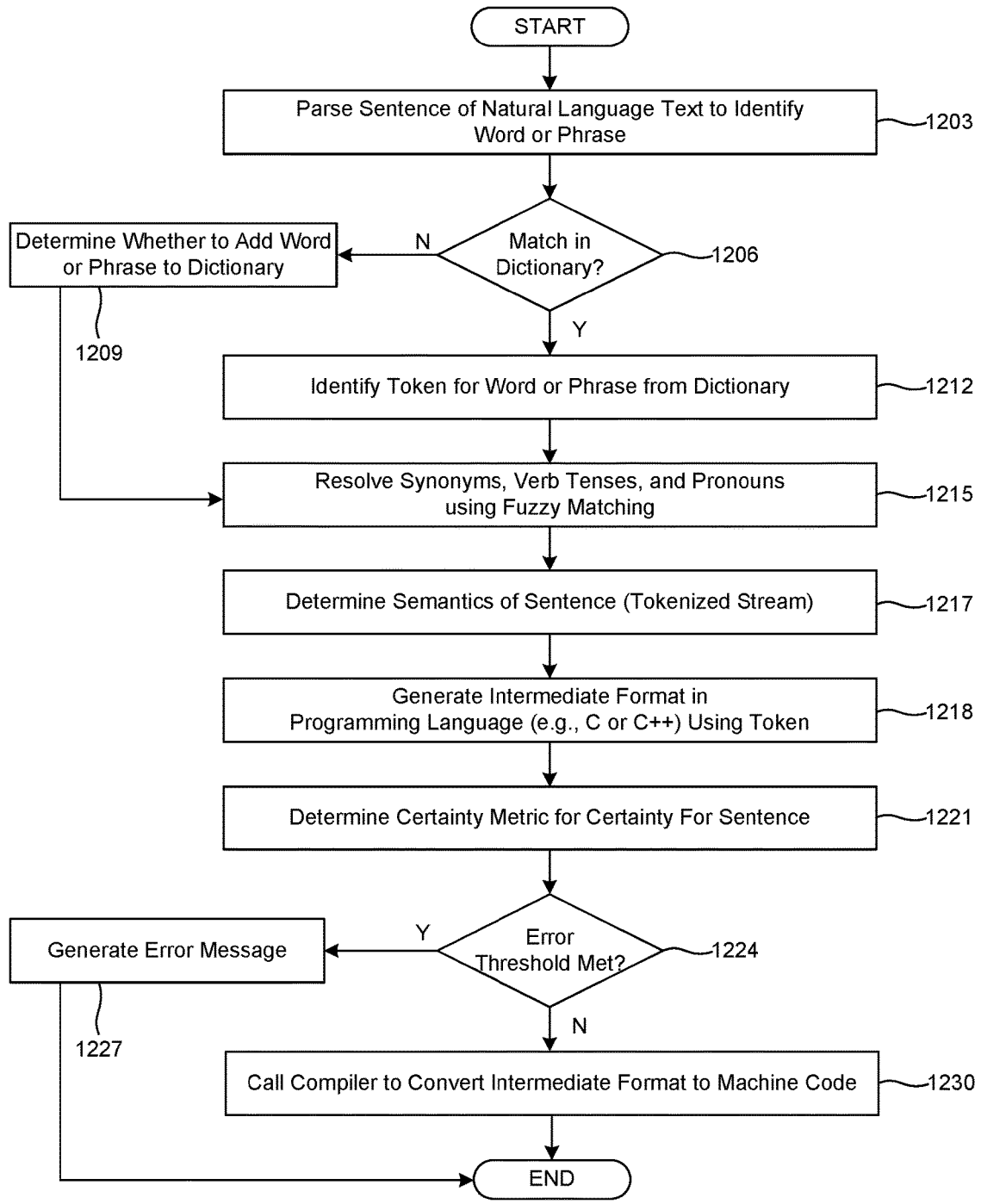
FIG. 12 is a flowchart illustrating one example of functionality implemented as portions of an application executing in a computing environment or a client device according to various embodiments of the present disclosure.

Referring next to FIG. 12, a flowchart 1200 is shown that provides another example operation of the natural language compiler 327 or other system or service according to various embodiments. It is understood that the flowchart 1200 of FIG. 12 provides merely an example of the many different types of functional arrangements that may be employed to perform automated program synthesis from a natural language for domain specific computing applications as described herein. As an alternative, the flowchart of FIG. 12 may be viewed as depicting an example of elements of a method implemented in the computing environment 303 or the client device 306 according to one or more embodiments.

Beginning with 1203, a sentence of natural language text 103 may be parsed to identify at least one word 345 or phrase 348 from the sentence. Next, in 1206, a determination may be made whether the word 345 or phrase 348 matches an entry in the dictionary 330. The dictionary 330 may include a listing of known words for a domain. In various embodiments, the dictionary 330 may include character names, as well as action verbs, adjectives, articles, etc. If the word 345 or phrase 348 does not having a matching entry in the dictionary 330, the process may proceed to 1209 where a determination may be made whether to add the word 345 or phrase 348 to the dictionary 330 (or to a temporary dictionary). More detail regarding this process is described above with respect to FIG. 7.

However, if the word 345 or phrase 348 is identified in the dictionary 330, a token 352 may be identified for the word 345 for use in generating the intermediate format. For instance, each word 345 stored in the dictionary 330 (or temporary dictionary), a token 352 may be identified to represent the word 345 when generating an intermediate format. The token 352 may also give a notion of the part of speech to the word 345. For example, the target word 345 may be a subject noun, object noun, action verb, pronoun, etc. For a sentence that states, "When the rabbit meets a fox, it is killed," a replacement of the tokens 352 with words 345 in the sentence may result in a sentence that states: "When rabbit meet fox, it die." As noted above, a sentence formed of tokens 352 may result in less computational complexity during a conversion of the natural language to the intermediate format.

Next, in 1215, given a combination of tokens 352 identified for a parsed sentence, synonyms, verb tenses, and pronouns may be resolved. In some embodiments, the order of the resolution may not be important. However, for purposes of discussion, synonym resolution is first described. As may be appreciated, there may be a multitude of ways in which a user can describe how two objects collide, such as "rabbit hits the fox" or "rabbit meets a carrot." All synonyms may be resolved and replaced by a representative term. A representative synonym for "killed" might include "die" while a synonym for "meet" may include "collide." An intermediate format of tokens 352 may include: "When rabbit meet fox, it is killed," which may be converted to "When rabbit collides fox, it die."

A sentence, also referred to as a tokenized stream, may be formed of tokens 352 used to replace words 345 or phrases 348 of natural language text 103. In 1217, the semantics of this sentence (or tokenized stream) may be determined. In natural language, it may be the case that there are multiple ways to express an idea. For example, the phrase "when rabbit collides with fox" may also be stated as "when rabbit and fox collide." Therefore, a representative format that expresses an idea may be determined such that all alternatives are converted to the representative format. This methodology is similar to resolving synonyms, except the operations are now performed at the grammatical level. For example, "A collides B" may be chosen as the representative way to describe how two objects collide. All occurrences of alternative ways to express this idea, such as "A and B collide," may be replaced with the representative format (e.g., "A collides B").

A uniform grammatical format may facilitate generating code in an intermediate format. In the example above, a set{collide, A, B} can be used to detect that objects A and B have collided; however, the order in which the three tokens 352 appear may not matter. Additional constraints may be added indicating that certain orders of "collide," "A," and "B" are not permitted.

In another example, consider the two sentences: "when the bird is shot" and "when the bird is shot by a bullet." In the first sentence, the bullet is missing but is implicit in the context (e.g., only guns are available as weapons in a shooting game domain). Hence, the grammar of the natural language compiler 327 must be configured to handle both cases. Here, {A shot} and {A shot by bullet} both can capture this grammar. In addition, the object "A" must appear before the token 352 "shot."

An implementation for an underlying grammatical structure may be flexible. It may range from explicit enumeration of all grammatical rules 333 to fuzzy rules, and anything in between. Ultimately, a match for a parsed tokenized stream may be determined. However, if no matching grammatical rule 333 is found, then a sentence may be discarded. Other ways to resolve this may be possible. For example, a rule may be defined that closely matches the tokenized stream and is employed to interpret the sentence. Alternatively, an error message may be generated that includes, for example, information on potential errors and possible fixes.

In some instances, approximate rule-matching may not correctly compile a story in natural language text 103 as intended by its author, a common issue in natural language programming. Without specifying a multitude of strict grammatical rules 333, one may misinterpret and misunderstand an original intent of the natural language text 103. However, this may be permissible as natural language by its nature is imprecise and ambiguous. The natural language compiler 327 may determine at least one way to interpret a sentence. Furthermore, it allows a user or developer to examine how he or she might want to express an idea in a different manner to better reflect his or her original intent.

With respect to generating a tokenized stream, one may have concern with replacing "kill" with "die", since converting "A kills B" to "A die B" may not make sense grammatically. Thus, the resolving of synonyms does take some context into account. In this example, there is no object after A, thus the word 345 "kill" may be represented by "die." The full grammatical structure of the sentence may not need to be determined—just the local context around the synonym in question. Sets can be used to represented synonyms as well as other graphical representations for a data structure.

As may be appreciated, new terms identified and added to the dictionary 330 (or temporary dictionary) may not have a synonym. In the earlier example of the word 345 "empowered," no synonym may be stored in association with the word 345 to represent the same concept. However, this may be updated if there are sentences that bind such terms. For example, if a sentence states, "when a rabbit is empowered, it is also fierce," the terms "empowered" and "fierce" may be identified as synonyms and stored in association with one another in the dictionary 330.

With respect to resolving pronouns, it may be beneficial to determine if any pronouns are used, such as "it." In various embodiments, two conditions may be analyzed. First, if a pronoun is in a third person form (e.g., "it") and it appears as the first subject, then the pronoun must refer to the subject of the previous sentence. For example, a paragraph may state, "The rabbit eats a carrot. Then it goes after the next carrot." The pronoun "it" appears in the second sentence as the first subject, and may be bound to the subject of the preceding sentence (e.g., "rabbit"). On the other hand, if there are other characters before the pronoun first appears, as in our running example "When rabbit collides fox, it dies," then the pronoun may be bound to the subject of this present sentence, which is the rabbit. Consequently, an intermediate format of tokens 352 now becomes "When rabbit collides fox, rabbit die."

Let $O_i^j$ denote the $i^{th}$ object (character) in sentence j. The rules for resolving third-person pronoun p is thus:

$$p=O_0^{j-1} \text{ if } p=O_0^j$$

$$p=O_0^j \text{ if } p=O_i^j, i>0$$

The same binding strategy may be employed for other third-person pronouns, such as "they," "he," or "she." For the pronoun "you," it is known to refer to a player controlling the video game 106. The resolution of "you" may thus be processed as such. For example, if the player controls the rabbit, any time "you" appears, it may simply refer to the rabbit.

Finally, verb tenses may be handled similar to resolving the synonyms, except for instances where the verb may be used either actively or passively. For example, "the rabbit eats a carrot" and "a carrot is eaten by the rabbit" provide a same idea with a same verb, though in different tenses. In various embodiments, all passive verb forms may be converted into active forms to facilitate subsequent code generation. However, separate code generation rules for active and passive verb uses may be employed.

In 1218, an intermediate format may be generated using the token 352. As noted above, each word 345 or phrase 348 in the dictionary 330 may be associated with a token 352 used to represent that word 345 or phrase 348 when generating an intermediate format. The token 352 may also give a notion of the part of speech to the word 345. For example, the target word 345 may be a subject noun, object noun, action verb, pronoun, etc. For a sentence that states, "When the rabbit meets a fox, it is killed," a replacement of the tokens 352 with words 345 in the sentence may result in a sentence that states: "When rabbit meet fox, it die." For instance, entries in the dictionary 330 for "meet," "meets," "met," etc. may be associated with a token 352 of "meet." This sentence formed of tokens 352 may result in less computational complexity during a conversion of the natural language to the intermediate format, as may be appreciated.

In 1221, a certainty metric 336 may be determined for each sentence of the natural language text 103. In one embodiment, the certainty metric 336 includes a number that reflects a percentage that the natural language compiler 327 is certain about an understanding of the sentence in English or other natural language.

In 1224, a determination may be made whether the certainty metric 336 meets a predetermined error threshold. For instance, the certainty metric may indicate that it has a rather low 20% certainty that the code in the intermediate format accomplishes what was defined in the natural language text 103. Whenever a sentence is unable to be resolved according to a threshold certainty (e.g., a low certainty due to grammatical errors or ambiguity), in 1227, an error message may be generated and communicated to a user in a user interface 372. In some embodiments, an error message is generated for each sentence and may include suggestions to fix the errors or to help the user debug the natural language text 103 in the sentence. In addition to generating an error message when a low certainty metric is determined, the error message of 1227 may also be generated for each sentence that did not match any grammatical rules 333.

Alternatively, if the certainty metric indicates that it has a high certainty (e.g., 60% or above) that the code in the intermediate format accomplishes what was defined in the natural language text 103, the process may proceed to 1230 where one or more compilers may be called to convert the code in the intermediate format to machine code. In one example, the natural language compiler 327 converts the natural language text 103 to an intermediate format of C++. Thereafter, a C++ compiler is called to convert the code in the intermediate format of C++ to assembly. An assembly compiler is then called to compile the assembly code into a hexadecimal representation of binary code or into binary code itself, as may be appreciated.

According to various embodiments, the natural language compiler 327 may generate code in an intermediate format for any programming language as administrator can choose a template for any language for implementing each phrase through use of a token 352. For example, when natural language text 103 is converted using tokens 352 to a sentence that states, "when rabbit collides fox, rabbit die," the sentence may be divided into two phrases. The first phrase may include: "when rabbit collides fox" which may be handled by the code "collide(A, B)," where A and B are arguments passed to the function/routine 355 "collide( )" Likewise, the second phrase of the stream may include: "rabbit die," which may be handled by the function/routine 355 "die(A)." The implementation of both the "collide( )" and "die( )" functions/routines 355 may be pre-written in any desired programming language. All functions/routines 355 that are used to implement the program may be combined together in a library 339.

Figure 13:
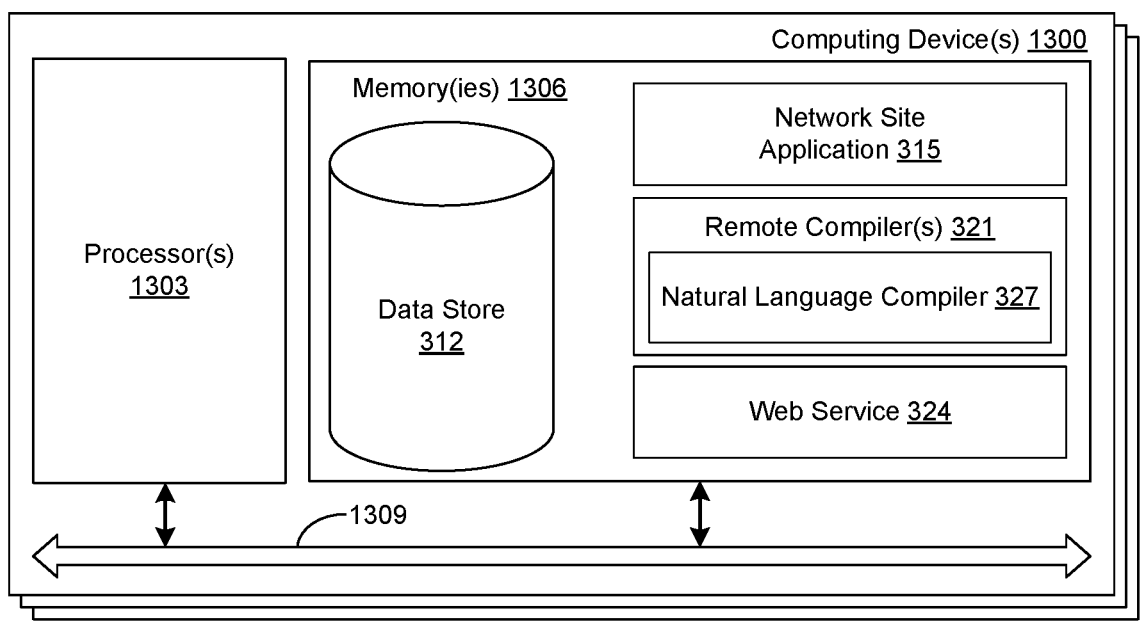
FIG. 13 is a schematic block diagram that provides one example illustration of a computing environment employed in the networked environment of FIG. 1 according to various embodiments of the present disclosure.

With reference to FIG. 13, shown is a schematic block diagram of the computing environment 303 according to an embodiment of the present disclosure. The computing environment 303 includes one or more computing devices 1300. Each computing device 1300 includes at least one processor circuit, for example, having a processor 1303 and a memory 1306, both of which are coupled to a local interface 1309. To this end, each computing device 1300 may comprise, for example, at least one server computer or like device. The local interface 1309 may comprise, for example, a data bus with an accompanying address/control bus or other bus structure as can be appreciated.

Stored in the memory 1306 are both data and several components that are executable by the processor 1303. In particular, stored in the memory 1306 and executable by the processor 1303 are the network site application 315, the remote compilers 321 (including the natural language compiler 327), the web service 324, and potentially other applications. Also stored in the memory 1306 may be a data store 312 and other data. In addition, an operating system may be stored in the memory 1306 and executable by the processor 1303.

It is understood that there may be other applications that are stored in the memory 1306 and are executable by the processor 1303 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 1306 and are executable by the processor 1303. In this respect, the term "executable" means a program file that is in a form that can ultimately be run by the processor 1303. Examples of executable programs may be, for example, a compiled program that can be translated into machine code in a format that can be loaded into a random access portion of the memory 1306 and run by the processor 1303, source code that may be expressed in proper format such as object code that is capable of being loaded into a random access portion of the memory 1306 and executed by the processor 1303, or source code that may be interpreted by another executable program to generate instructions in a random access portion of the memory 1306 to be executed by the processor 1303, etc. An executable program may be stored in any portion or component of the memory 1306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1306 is defined herein as including both volatile and nonvolatile memory and data storage components. Volatile components are those that do not retain data values upon loss of power. Nonvolatile components are those that retain data upon a loss of power. Thus, the memory 1306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1303 may represent multiple processors 1303 and/or multiple processor cores and the memory 1306 may represent multiple memories 1306 that operate in parallel processing circuits, respectively. In such a case, the local interface 1309 may be an appropriate network that facilitates communication between any two of the multiple processors 1303, between any processor 1303 and any of the memories 1306, or between any two of the memories 1306, etc. The local interface 1309 may comprise additional systems designed to coordinate this communication, including, for example, performing load balancing. The processor 1303 may be of electrical or of some other available construction.

Although the network site application 315, the remote compilers 321 (including the natural language compiler 327), the web service 324, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6, 7, and 12 show the functionality and operation of an implementation of portions of the network site application 315, the remote or local compilers 321/403 (including the natural language compiler 327), and the web service 324. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1303 in a computer system or other system. The machine code may be converted from the source code, etc. If embodied in hardware, each block may represent a circuit or a number of interconnected circuits to implement the specified logical function(s).

Although the flowcharts of FIGS. 6, 7, and 12 show a specific order of execution, it is understood that the order of execution may differ from that which is depicted. For example, the order of execution of two or more blocks may be scrambled relative to the order shown. Also, two or more blocks shown in succession in FIGS. 6, 7, and 12 may be executed concurrently or with partial concurrence. Further, in some embodiments, one or more of the blocks shown in FIGS. 6, 7, and 12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site application 315, the remote or local compilers 321/403 (including the natural language compiler 327), and the web service 324, that comprises software or code can be embodied in any non-transitory computer-readable medium for use by or in connection with an instruction execution system such as, for example, a processor 1303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network site application 315, the remote or local compilers 321/403 (including the natural language compiler 327), and the web service 324, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1300, or in multiple computing devices in the same computing environment 303. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising at least one hardware processor; and
   program instructions executable in the at least one computing device that, when executed, cause the at least one computing device to:
   identify a plurality of words from at least one sentence of text formed in a natural language following a grammatical structure for the natural language;
   compare the plurality of words to a dictionary to determine whether individual ones of the plurality of words have a corresponding entry in the dictionary;
   in response to a first one of the plurality of words having a corresponding entry in the dictionary, identify a first token stored in association with the corresponding entry for the first one of the plurality of words;
   in response to a second one of the plurality of words not having a corresponding entry in the dictionary:
   identify an object from the plurality of words of the at least one sentence of text;
   determine a meaning for the second one of the plurality of words based at least in part on a contextual analysis of an antecedent clause of the at least one sentence of text and a consequent clause of a subsequent or preceding sentence of text of the at least one sentence of text, and store a second token in association with a corresponding entry for the second one of the plurality of words; and
   bind the second one of the plurality of words to the object such that the second one of the plurality of words is a variable for the object that can be consulted during execution of an application;
   in response to a third one of the plurality of words not having a corresponding entry in the dictionary and a meaning of the third one of the plurality of words unable to be determined, generate an error message to provide on the at least one computing device;
   in response to an error associated with the third one of the plurality of words being resolved, convert the text formed in the natural language to an intermediate format of programming code in a predetermined programming language, wherein the intermediate format comprises the first token or the second token, the first token and the second token invoking at least one function or at least one routine of a library written in the predetermined programming language; and
   compile the intermediate format into executable program code to generate the application configured for execution.

2. The system of claim 1, wherein:
   the application is a video game application; and
   the library comprises a plurality of functions or a plurality of routines corresponding to a video game application domain.

3. The system of claim 1, further comprising program instructions executable in the at least one computing device that, when executed, cause the at least one computing device to store the at least one of the plurality of words in the dictionary or a temporary dictionary separate from the dictionary in association with the meaning.

4. The system of claim 1, wherein the contextual analysis comprises:
   analyzing the antecedent clause of the at least one sentence and analyzing the consequent clause of a subsequent sentence of the at least one sentence; or
   analyzing the antecedent clause of the at least one sentence and analyzing the consequent clause of a preceding sentence of the at least one sentence.

5. The system of claim 1, wherein comparing the plurality of words to the dictionary comprises applying a fuzzy matching methodology.

6. The system of claim 1, further comprising program instructions executable in the at least one computing device that, when executed, cause the at least one computing device to generate user interface data for rendering a user interface in a display of a client device, wherein the user interface comprises a text field for entry of the text formed in the natural language.

7. The system of claim 6, wherein the at least one computing device is a device located remotely from the client device on which the text is provided, the text being received by the computing device from the client device over a network.

8. The system of claim 1, wherein the at least one computing device is a client device, the program instructions being executed locally on the client device.

9. The system of claim 1, further comprising program instructions executable in the at least one computing device that, when executed, cause the at least one computing device to generate a certainty metric for the sentence that indicates a degree to which the sentence was understood programmatically.

10. The system of claim 9, further comprising program instructions executable in the at least one computing device that, when executed, cause the at least one computing device to generate the error message in response to the certainty metric satisfying an error threshold.

11. A computer-implemented method, comprising:
identifying, by at least one computing device, a plurality of words from at least one sentence of text formed in a natural language following a grammatical structure for the natural language;
comparing, by the at least one computing device, the plurality of words to a dictionary to determine whether individual ones of the plurality of words have a corresponding entry in the dictionary;
in response to at least a first one of the plurality of words having a corresponding entry in the dictionary, identifying, by the at least one computing device, a first token stored in association with the corresponding entry for the first one of the plurality of words;
in response to a second one of the plurality of words not having a corresponding entry in the dictionary:
identifying an object from the plurality of words of the at least one sentence of text;
determining a meaning of the second one of the words based at least in part on a contextual analysis of an antecedent clause of the at least one sentence and a consequent clause of a subsequent or preceding sentence of text of the at least one sentence of text, and storing a second token in association with a corresponding entry for the second; and
binding the second one of the plurality of words to the object such that the second one of the plurality of words is a variable for the object that can be consulted during execution of an application;
in response to a third one of the plurality of words not having a corresponding entry in the dictionary and a meaning of the third one of the plurality of words unable to be determined, generating an error message to provide on the at least one computing device;
in response to an error associated with the third one of the plurality of words being resolved, converting, by the at least one computing device, the text formed in the natural language to an intermediate format of programming code in a predetermined programming language, wherein the intermediate format comprises the first token or the second token, the first token and the second token invoking at least one function or at least one routine of a library written in the predetermined programming language; and
compiling, by the at least one computing device, the intermediate format into executable program code to generate the application configured for execution.

12. The computer-implemented method of claim 11, wherein:
the application is a video game application; and
the library comprises a plurality of functions or a plurality of routines corresponding to a video game application domain.

13. The computer-implemented method of claim 11, further comprising storing, by the at least one computing device, the at least a first word in the dictionary or a temporary dictionary separate from the dictionary in association with the meaning.

14. The computer-implemented method of claim 11, wherein the contextual analysis comprises:
analyzing the antecedent clause of the at least one sentence and analyzing the consequent clause of a subsequent sentence of the at least one sentence; or
analyzing the antecedent clause of the at least one sentence and analyzing the consequent clause of a preceding sentence of the at least one sentence.

15. The computer-implemented method of claim 11, wherein comparing the plurality of words to the dictionary comprises applying, by the at least one computing device, a fuzzy matching methodology.

16. The computer-implemented method of claim 11, further comprising generating, by the at least one computing device, user interface data for rendering a user interface in a display of a client device, wherein the user interface comprises a text field for entry of the text formed in the natural language.

17. The computer-implemented method of claim 16, wherein the at least one computing device is a device located remotely from the client device on which the text is provided, the text being received by the computing device from the client device over a network.

18. The computer-implemented method of claim 11, wherein the at least one computing device is a client device, the computer-implemented method being performed locally on the client device.

19. The computer-implemented method of claim 11, further comprising generating, by the computing device, a certainty metric for the sentence that indicates a degree to which the sentence was understood programmatically.

20. The computer-implemented method of claim 19, further comprising generating, by the computing device, the error message in response to the certainty metric satisfying an error threshold.

* * * * *